United States Patent
Guo et al.

(10) Patent No.: US 8,797,692 B1
(45) Date of Patent: Aug. 5, 2014

(54) MAGNETIC RECORDING SENSOR WITH AFM EXCHANGE COUPLED SHIELD STABILIZATION

(75) Inventors: Yimin Guo, San Jose, CA (US); Rongfu Xiao, Dublin, CA (US); Yuankai Zheng, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/607,593

(22) Filed: Sep. 7, 2012

(51) Int. Cl.
 *G11B 5/11* (2006.01)
 *G11B 5/39* (2006.01)

(52) U.S. Cl.
 USPC .......................................................... 360/319

(58) Field of Classification Search
 USPC .......... 360/319, 324.1, 324.11, 324.12, 324.2
 See application file for complete search history.

(56) References Cited

U.S. PATENT DOCUMENTS

| | | | |
|---|---|---|---|
| 5,621,592 A | 4/1997 | Gill et al. |
| 5,750,275 A | 5/1998 | Katz et al. |
| 5,804,250 A | 9/1998 | Yang |
| 5,838,521 A | 11/1998 | Ravipati |
| 6,033,491 A | 3/2000 | Lin |
| 6,087,027 A | 7/2000 | Hoshiya et al. |
| 6,129,957 A | 10/2000 | Xiao et al. |
| 6,233,116 B1 | 5/2001 | Chen et al. |
| 6,259,583 B1 | 7/2001 | Fontana, Jr. et al. |
| 6,292,334 B1 | 9/2001 | Koike et al. |
| 6,315,839 B1 | 11/2001 | Pinarbasi et al. |
| 6,322,640 B1 | 11/2001 | Xiao et al. |
| 6,358,635 B1 | 3/2002 | Min et al. |
| 6,373,667 B1 | 4/2002 | Han et al. |
| 6,413,325 B1 | 7/2002 | Shimazawa et al. |
| 6,430,015 B2 | 8/2002 | Ju et al. |
| 6,437,949 B1 | 8/2002 | Macken et al. |
| 6,452,385 B1 | 9/2002 | Shimazawa et al. |
| 6,456,467 B1 | 9/2002 | Mao et al. |
| 6,478,884 B2 | 11/2002 | Shimazawa et al. |
| 6,482,657 B2 | 11/2002 | Shimazawa |
| 6,496,335 B2 | 12/2002 | Gill |
| 6,628,478 B2 | 9/2003 | Gill |
| 6,724,581 B2 | 4/2004 | Westwood |
| 6,754,048 B2 | 6/2004 | Li et al. |
| 6,778,358 B1 | 8/2004 | Jiang et al. |
| 6,791,796 B2 | 9/2004 | Shukh et al. |
| 6,801,409 B2 | 10/2004 | Michel et al. |
| 6,818,330 B2 | 11/2004 | Shukh et al. |
| 6,848,169 B2 | 2/2005 | Shin et al. |

(Continued)

FOREIGN PATENT DOCUMENTS

JP 2002298314 A 10/2002

*Primary Examiner* — Jefferson Evans

(57) ABSTRACT

A magnetic recording sensor with AFM exchange coupled shield stabilization for use in a data storage device includes a read sensor positioned between a bottom shield and a top shield. The top shield comprises a first ferromagnetic (FM) layer, a coupling layer, and a second FM layer. An exchange coupling insertion layer is provided between the second FM layer and an antiferromagnetic (AFM) layer above. In an embodiment of the invention, the exchange coupling insertion layer comprises CoFe with a Fe content from about 35-45 at. %, and thickness from about 1 nm to about 3 nm. In another embodiment of the invention, the exchange coupling insertion layer comprises a bi-layer, including first sub-layer comprising CoFe with Fe content from about 8-12 at. %, and second sub-layer comprising CoFe with Fe content from about 35-45 at. %, and the bi-layer has a thickness less than about 4 nm.

13 Claims, 3 Drawing Sheets

(56) References Cited

U.S. PATENT DOCUMENTS

| | | |
|---|---|---|
| 6,876,507 B2 | 4/2005 | Chen et al. |
| 6,927,952 B2 | 8/2005 | Shimizu et al. |
| 6,967,823 B2 | 11/2005 | Nakamoto et al. |
| 6,980,403 B2 | 12/2005 | Hasegawa |
| 6,998,061 B1 | 2/2006 | Cross |
| 7,029,771 B2 | 4/2006 | Hasegawa et al. |
| 7,046,487 B2 | 5/2006 | Terunuma |
| 7,057,853 B2 | 6/2006 | Okada et al. |
| 7,158,351 B2 | 1/2007 | Nakamoto et al. |
| 7,166,173 B2 | 1/2007 | Beach |
| 7,170,723 B2 | 1/2007 | Taguchi |
| 7,180,712 B1 | 2/2007 | Li et al. |
| 7,270,896 B2 | 9/2007 | Parkin |
| 7,295,401 B2 | 11/2007 | Jayasekara et al. |
| 7,324,309 B1 | 1/2008 | Wiesen et al. |
| 7,342,751 B2 | 3/2008 | Nagasaka et al. |
| 7,382,574 B2 | 6/2008 | Li et al. |
| 7,426,091 B2 | 9/2008 | Okada et al. |
| 7,443,639 B2 | 10/2008 | Parkin |
| 7,446,979 B2 | 11/2008 | Jayasekara |
| 7,457,080 B2 | 11/2008 | Watabe et al. |
| 7,551,394 B2 | 6/2009 | Sasaki et al. |
| 7,554,765 B2 | 6/2009 | Shukh et al. |
| 7,599,154 B2 | 10/2009 | Sbiaa et al. |
| 7,606,007 B2 | 10/2009 | Gill |
| 7,606,010 B2 | 10/2009 | Parkin |
| 7,652,854 B2 | 1/2010 | Kagami et al. |
| 7,666,467 B2 | 2/2010 | Parkin |
| 7,773,341 B2 | 8/2010 | Zhang et al. |
| 7,807,218 B2 | 10/2010 | Parkin |
| 7,859,797 B2 | 12/2010 | Hoshino et al. |
| 7,906,231 B2 | 3/2011 | Parkin |
| 7,911,737 B1 | 3/2011 | Jiang et al. |
| 8,049,997 B2 | 11/2011 | Miyauchi et al. |
| 8,089,734 B2 | 1/2012 | Miyauchi et al. |
| 8,125,743 B2 | 2/2012 | Ohta et al. |
| 8,402,635 B2 | 3/2013 | Degawa et al. |
| 8,441,756 B1 | 5/2013 | Sun et al. |
| 8,451,567 B2 * | 5/2013 | Zhou et al. ............... 360/324.12 |
| 8,472,147 B2 * | 6/2013 | Singleton et al. ............. 360/319 |
| 8,531,801 B1 | 9/2013 | Xiao et al. |
| 2001/0043446 A1 | 11/2001 | Barlow et al. |
| 2002/0064002 A1 | 5/2002 | Gill |
| 2002/0149886 A1 | 10/2002 | Gill |
| 2004/0120074 A1 | 6/2004 | Okada et al. |
| 2004/0196681 A1 | 10/2004 | Xiao et al. |
| 2005/0013044 A1 | 1/2005 | Hirata et al. |
| 2005/0264948 A1 * | 12/2005 | Nakamoto et al. ............ 360/319 |
| 2006/0003185 A1 | 1/2006 | Parkin |
| 2006/0044682 A1 | 3/2006 | Le et al. |
| 2006/0109592 A1 | 5/2006 | Watanabe et al. |
| 2006/0119981 A1 | 6/2006 | Li et al. |
| 2007/0019341 A1 | 1/2007 | Mizuno et al. |
| 2007/0053114 A1 | 3/2007 | Uesugi et al. |
| 2007/0111332 A1 | 5/2007 | Zhao et al. |
| 2007/0195467 A1 * | 8/2007 | Gill .............................. 360/319 |
| 2008/0013221 A1 | 1/2008 | Ohta et al. |
| 2008/0179699 A1 | 7/2008 | Horng et al. |
| 2009/0027810 A1 | 1/2009 | Horng et al. |
| 2009/0052092 A1 | 2/2009 | Zhou et al. |
| 2009/0128944 A1 | 5/2009 | Jang et al. |
| 2009/0168240 A1 | 7/2009 | Hsiao et al. |
| 2009/0174971 A1 | 7/2009 | Tsuchiya et al. |
| 2009/0279213 A1 * | 11/2009 | Wu et al. ....................... 360/319 |
| 2010/0039734 A1 | 2/2010 | Hara et al. |
| 2010/0079917 A1 | 4/2010 | Miyauchi et al. |
| 2010/0149689 A1 * | 6/2010 | Tsuchiya et al. ........... 360/234.3 |
| 2010/0320076 A1 | 12/2010 | Zhao et al. |
| 2011/0097601 A1 | 4/2011 | Bai et al. |
| 2011/0273802 A1 | 11/2011 | Zhou et al. |
| 2011/0279923 A1 | 11/2011 | Miyauchi et al. |
| 2011/0317313 A1 | 12/2011 | Miyauchi et al. |
| 2012/0087045 A1 * | 4/2012 | Yanagisawa et al. ......... 360/294 |
| 2012/0087046 A1 * | 4/2012 | Yanagisawa et al. ......... 360/294 |
| 2012/0134057 A1 | 5/2012 | Song et al. |
| 2012/0147504 A1 * | 6/2012 | Zhou et al. ............... 360/324.12 |
| 2012/0250189 A1 * | 10/2012 | Degawa et al. ............ 360/235.4 |
| 2012/0281320 A1 | 11/2012 | Singleton et al. |

* cited by examiner

US 8,797,692 B1

MAGNETIC RECORDING SENSOR WITH AFM EXCHANGE COUPLED SHIELD STABILIZATION

BACKGROUND OF THE INVENTION

Disk drives typically use heads residing on sliders to read from and write to the magnetic media. Read and write transducers residing in the head are flown at a small, controlled spacing above the magnetic medium (disk) during read and write operations. An air bearing forms between the head and the disk due to the disk rotating at high speeds to provide controlled head to disk spacing. Magnetic fields emanating from the write transducer pole tip switches magnetization of the magnetic medium, i.e., writing to the medium. Among other factors, a smaller and more tightly controlled magnetic writing field will allow more data to be written in the same space, thereby increasing areal density.

FIG. 1 illustrates a conventional disk drive 10 used for data storage. Figures are not drawn to scale and only certain structures are depicted for clarity. Disk media 50 is attached to spindle motor and hub 20. The spindle motor and hub 20 rotate the media 50 in a direction shown by arrow 55. Head stack assembly (HSA) 60 includes a magnetic recording head 30 on actuator arm 70 and positions actuator arm 70 by positioning the voice coil motor (VCM) 25 over a desired data track, shown as recording track 40 in this example, to write data onto the media 50.

FIG. 1a illustrates an enlarged view of a section of FIG. 1 including head 30' and track 40. A magnetic recording transducer 90 is fabricated on slider 80. Slider 80 may be attached to suspension 75 and suspension 75 may be attached to actuator arm 70 as shown in FIG. 2. A read transducer 93 is also fabricated on slider 80.

Referring again to FIG. 2, Slider 80 is illustrated above recording track 40. Media 50 and track 40 are moving under slider 80 in a down-track direction shown by arrow 42. The cross-track direction is shown by arrow 41.

The magnetic recording transducer 90 has a leading edge 91 and a trailing edge 92. In this embodiment, the trailing edge 92 of recording transducer 90 is the final portion of magnetic transducer 90 that writes onto the recording track 40 as the media moves under the slider 80 in down-track direction 42.

FIG. 2 illustrates a side view of the disk drive 10 shown in FIG. 1. At least one disk media 50 is mounted onto spindle motor and hub 20. HSA 60 comprises at least one actuator arm 70 that carries suspension 75 and slider 80. Slider 80 has an air bearing surface (ABS) facing media 50. When the media is rotating and actuator arm 70 is positioned over the media 50, slider 80 floats above media 50 by aerodynamic pressure created between the slider ABS and the surface of media 50 facing the ABS of slider 80.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention. References to top, side, bottom, or similar terms are used for descriptive purposes with reference to the figures and descriptions and should not be taken as limiting the scope of the invention.

Figures 1, 1A:
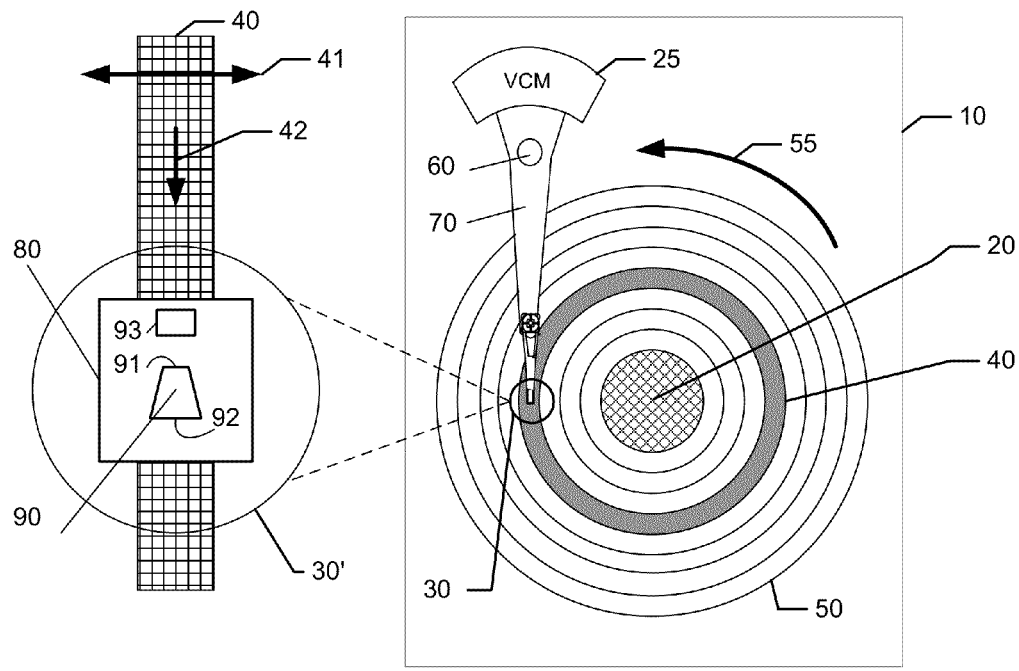
FIGS. 1 and 1a illustrate a top view of conventional hard disk drive.
Figure 2:
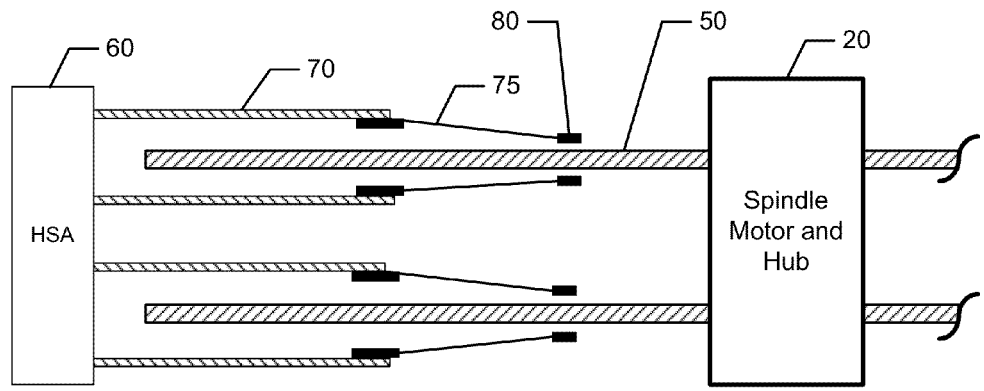
FIG. 2 illustrates a side view of a conventional hard disk drive
Figure 3:
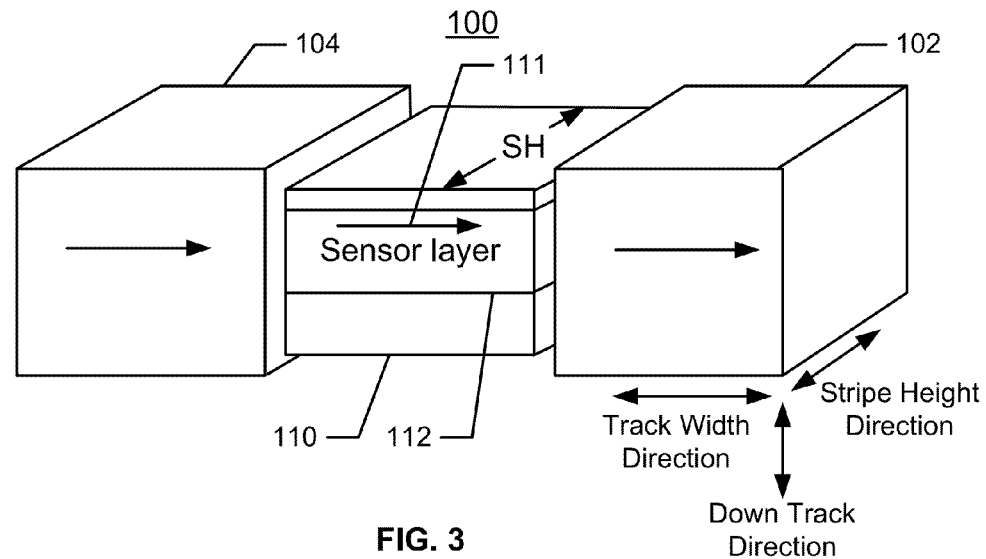
FIG. 3 illustrates a perspective view of a portion of a read transducer and side structures in accordance with one embodiment of the invention.

FIG. 3 illustrates a perspective view of a portion of a read transducer 100 including side structures 102 and 104. The read transducer 100 may be part of a read head or may be part of a merged head that also includes a write transducer. The head of which the read transducer 100 is a part is part of a disk drive having a media, a slider and the head coupled with the slider, analogous to that described in FIGS. 1-1a The read transducer 100 includes a read sensor 110 and side structure 102 and side structure 104. In general, the read transducer 100 will also include shields above and below the read sensor 110, and will be described in detail in following sections. The read sensor 110 includes a sensor layer 112. In some embodiments, the read sensor 110 may comprise a giant magnetoresistive (GMR) or tunneling magnetoresistive (TMR) sensor, although in other embodiments, other magnetoresistive type sensors may be used as well. Accordingly, the sensor layer 112 may include a free layer. The read sensor 110 may also include a pinning layer such as an antiferromagnetic (AFM) layer, pinned layer, and a nonmagnetic spacer or barrier layer between the pinned and free layers. The read sensor 110 may also include seed and/or capping layer(s). The nonmagnetic spacer/barrier layer may be above or below the sensor layer. Depending on the type of read sensor used and biasing mechanisms selected, the side structures 102 and 104 may be hard magnetic bias (e.g., a permanent magnet), a soft magnetic bias (e.g., indirectly biased by another structure) or an unbiased soft magnetic material. The side structures 102 and 104 also may act as a magnetic shield. In other embodiments, the side structures may be nonmagnetic material. While any type of side structure may be used, it may be particularly advantageous when the side structures 102 and 104 comprise soft magnetic material.

The sensor layer 112 has edges in the track width direction. The side structures 102 and 104 may be separated with a thin nonmagnetic gap from these edges of the sensor layer 112. Thus, the side structures 102 and 104 are adjacent to and separate from the sides of the read sensor 110. In some embodiments, the side structures 102 and 104 comprise soft magnetic material(s). For example, the side structures 102 and/or 104 may comprise NiFe, such as Permalloy. Because the soft magnetic side structures 102 and 104 have high permeability, the side structures 102 and 104 may operate to shield the sensor layer 112 from stray fields entering through the edges.

In some embodiments, the side structures 102 and/or 104 may magnetically bias certain layers of the sensor layer 112 as shown by an arrow in magnetic orientation 111, in addition to providing side shielding from extraneous magnetic fields.

Although not depicted in FIG. 3, the read transducer 100 may include shields in the down track directions (i.e., on the top of bottom of the sensor 110). In some embodiments, the side structures 102 and/or 104 may be magnetically connected with either or both of these shields. The side structures 102 and 104 are also depicted in FIG. 3 as extending both above and below the sensor layer 112. In other embodiments, however, they may extend only to an opposite edge of the sensor layer 112. For example, if the side structures 102 and/or 104 are connected to a bottom shield below the sensor layer 112, then the side structures 102 and/or 104 may extend from the bottom shield to the top of the sensor layer 112. Conversely, if the side structures 102 and/or 104 are connected to a top shield above the sensor layer 112, then the side structures 102 and/or 104 may extend from the bottom shield to the bottom of the sensor layer 112.

In some embodiments, the side structures 102 and/or 104 are composed of a single full film high permeability material. For example, Permalloy may be used to form the side structures 102 and/or 104. In other embodiments, the side structures 102 and/or 104 include multiple materials, which may not all have a high permeability. For example, the side structures 102 and/or 104 may comprise a multilayer. For example, the multilayer may include a first AFC enhancing layer, a second AFC enhancing layer, and a nonmagnetic layer between the first AFC enhancing layer and the second AFC enhancing layer. In some embodiments, the first and second AFC enhancing layers may be antiferromagnetically aligned. In other embodiments, the first and second AFC enhancing layer may be ferromagnetically aligned. In other embodiments, all of the layers in the multilayer may be ferromagnetic.

In the embodiment illustrated in FIG. 3, the side structures 102 and/or 104 have a stripe height SH. Further, the stripe height of the side structures 102 and/or 104 is illustrated substantially the same as that of the sensor layer 112. However, in other embodiments, the sensor layer 112 may have a different stripe height than the side structures 102 and 104. For example, soft magnetic side structure 102 and/or 104 may extend further than, or not as far as, the sensor layer 112 in the stripe height direction. In addition, the thickness of the side structure 102 and/or 104 may change in the stripe height direction and/or the track width direction.

Soft magnetic side structure 102 and/or 104 may shield the sensor layer 112 from stray magnetic fields that would otherwise enter the sides of the sensor layer 112. Consequently, the cross-track resolution of the read transducer 100 may be improved. Stated differently, the magnetic track width for a particular physical width of the sensor layer 112 may be reduced. Further, the ability to utilize recording methods such as shingle recording using the read transducer 100 may be improved. The read transducer 100 also does not need to have an in-stack bias layer. Instead, soft magnetic side structures 102 and/or 104 may magnetically bias the sensor layer 112. Thus, the improvements in resolution may be achieved while maintaining a lower shield-to-shield spacing. Instead of providing a hard bias layer, the side structures 102 and/or 104 may magnetically bias the sensor layer 112 such that its equilibrium magnetization is in-plane and parallel or anti-parallel to the magnetization 111 shown. Further, the shape anisotropy of the side structures 102 and/or 104 may result in magnetic charges at the edges of the side structures 102 and/or 104 in the track width direction. These magnetic charges may further contribute to the biasing of the sensor layer 112. Thus, the improvements in resolution and shield-to-shield spacing may be achieved while maintaining a suitable magnetic bias of the sensor layer 112.

Figure 4:
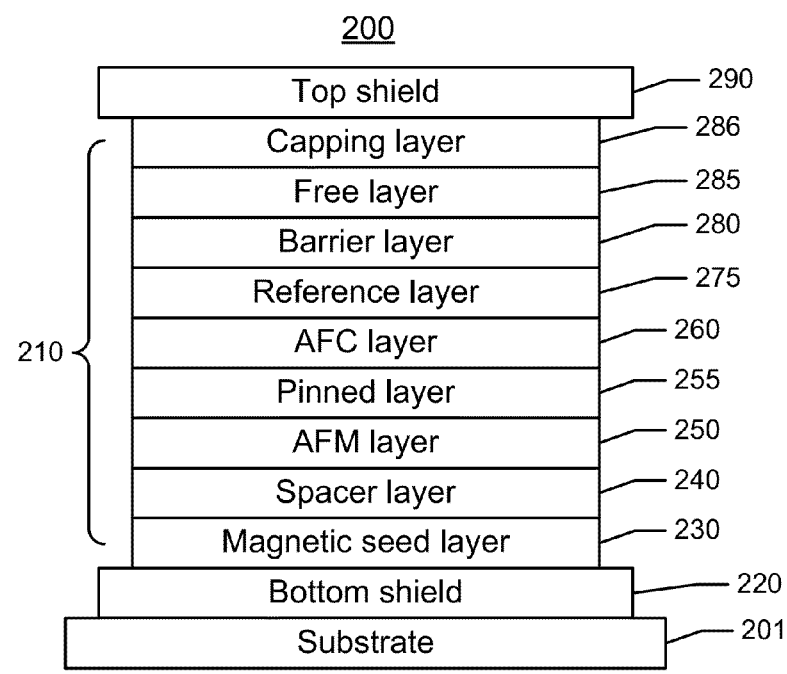
FIG. 4 illustrates a view of a read transducer comprising multiple layers positioned between shields in accordance with one embodiment of the invention.

FIG. 4 illustrates a view of a read transducer 200 comprising multiple layers positioned between shields, and is an embodiment analogous to one described generally in FIG. 3, however, the side structures are not depicted. A bottom shield 220 resides on a substrate 201. The substrate 201 may be any suitable underlayer and may include, for example, alumina (AlOx). A read sensor 210 resides above bottom shield 220. Bottom shield 220 may comprise soft magnetic material. A top shield 290 resides above and magnetically shields the read sensor 210. Top shield 290 may comprise soft magnetic material and in one embodiment of the invention, may comprise the same soft magnetic material as used in bottom magnetic shield 220.

In one embodiment of the invention, read sensor 210 comprises magnetic seed layer 230, spacer layer 240, AFM layer 250, pinned layer 255, and AFM coupling (AFC) layer 260. In one embodiment of the invention, AFM Layer 250 may comprise IrMn, RuMn, FeMn; and in another aspect may also comprise PdMn, NiMn, or PtMn if a higher blocking temperature is desired. Spacer layer 240 functions to magnetically separate the magnetic seed layer 230 from AFM layer 250, so the magnetic seed layer 230 won't be pinned by AFM layer 250. In one embodiment of the invention, spacer layer 240 may comprise, for example, Ru, Ti, or Ta, or their combinations.

Pinned layer 255 is above AFM layer 250 and may comprise, for example, CoFe or CoFeB. The AFM layer 250 stabilizes the pinned layer 255. The magnetization (not shown) of pinned layer 255 is substantially fixed, or pinned. The magnetization is fixed by annealing the read sensor 210 in an oriented magnetic field at an annealing temperature. AFC layer 260 is above pinned layer and 255 and provides anti-parallel alignment from the pinned layer 255 to reference layer 275 above, and may comprise, for example, Ru.

Reference layer 275 is above AFC layer 260. A barrier layer 280 is above reference layer 275 and a free layer 285 above barrier layer 280. A capping layer 286 is above free layer 285. The read sensor 210 has a resistance that varies in response to the relative magnetic orientations of the reference layer 275 below the barrier layer 280, and the free layer 285 above. The orientation of free layer 285 may move, or switch, in response to an external field such as that from a magnetic recording medium. A sense current may be passed between bottom shield 220 and top shield 290; and as the magnetic field emanating from the recording medium passes the free layer 285, the resistance changes, thereby affecting the sense current, which may be used to provide an electrical signal. This configuration is referred to as current perpendicular to plane (CPP), although other configurations known in the art such as current in plane (CIP) may also be used.

Figure 5:
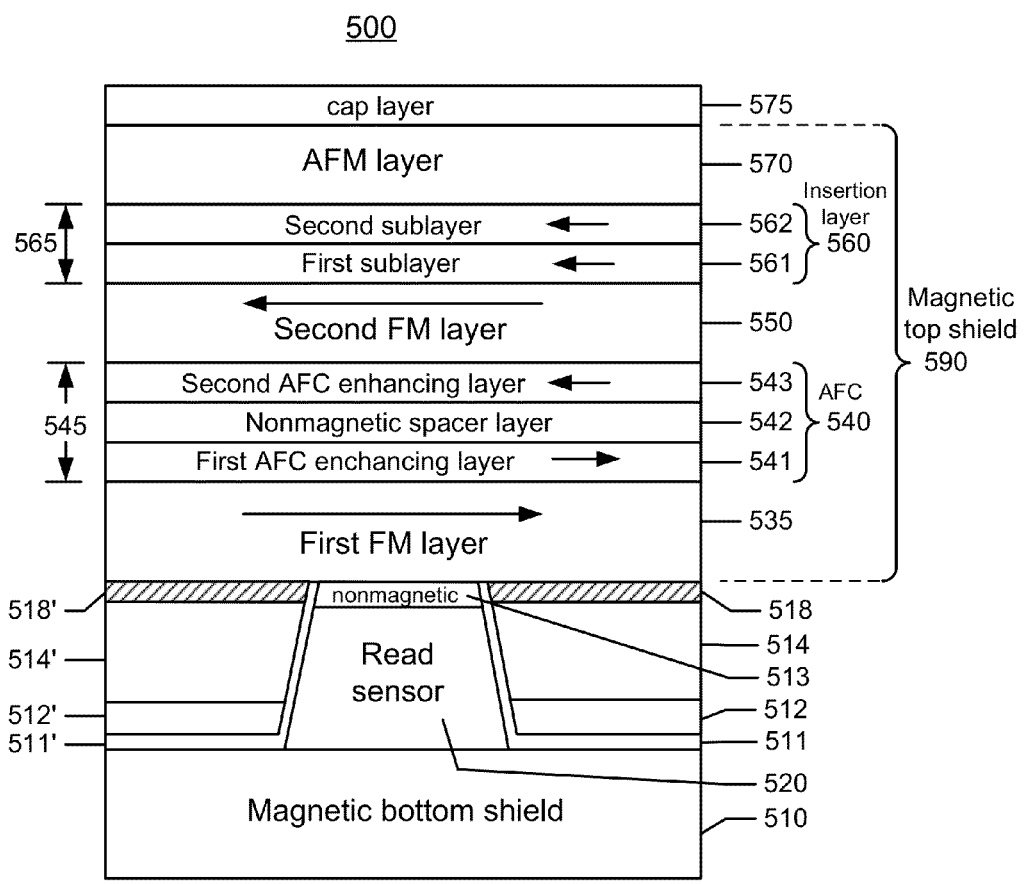
FIG. 5 illustrates a plan view of a section of a magnetic recording transducer in accordance with several embodiments of the subject invention.

FIG. 5 illustrates a plan view of a section of a transducer 500 for magnetic recording in accordance with several embodiments of the subject invention.

A read sensor 520 resides between a magnetic bottom shield 510 and a magnetic top shield 590, in a manner analogous to read transducer 200 in FIG. 4. In the embodiment shown in transducer 500, however, the magnetic top shield 590 includes an AFM exchange coupled shield and stabilization layers.

Read sensor 520 is positioned above magnetic bottom shield 510; and between side structure 514 and side structure 514'. Nonmagnetic dielectric gap 511 and 511' separates read sensor 520 from side structures 514 and 514'. In one embodiment of the invention, spacer layers 512 and 512' may be included to provide magnetic separation between the magnetic bottom shield 510 and the side structures 514 and 514' respectively. Similarly, nonmagnetic spacers (not shown) may reside above side structures 514 and 514' and below the magnetic top shield 590, or alternately below nonmagnetic layers 518 and 518', if used. In another embodiment of the invention, spacer layers 512 and 512' may comprise seed layer(s) to improve magnetic alignment with the side structures 514 and 514' and may provide better magnetic performance of read sensor 520. A nonmagnetic layer 513 is above read sensor 520 to provide separation, and may comprise, for example, Ta, Ti, or Ru, or their combinations; including a Ru/Ta bilayer or multilayer structure.

In one embodiment of the invention, transducer 500, side structures 514 and 514' comprise soft magnetic material, and in one particular embodiment of the invention may comprise NiFe.

In one embodiment of the invention, nonmagnetic layers 518 and 518' may be applied above side structures 514 and 514' respectively. In some embodiments, the addition of nonmagnetic layers 518 and 518' may be desirable to separate a side structure comprising a hard bias from the soft magnetic material in magnetic top shield 590 above.

In another embodiment of the invention, nonmagnetic layers 518 and 518' are omitted, and side structure 514 and side structure 514' are positioned adjacent to magnetic top shield 590. In one aspect of this embodiment of the invention, the first ferromagnetic (FM) layer 535 of magnetic top shield 590, the side structure 514, and side structure 514' are one structure, i.e., applied directly in contact with each other.

In one embodiment of the invention, magnetic top shield 590 comprises exchange coupled FM layers. A first FM layer 535 comprising soft magnetic material is positioned above nonmagnetic spacer layer 513 and also above side structures 514 and 514'; or optionally above nonmagnetic layers 518 and 518'. A second FM layer 550 comprising soft magnetic material is anti-parallel aligned to the first FM layer 535 by AFC layer 540. In this embodiment of the invention, first FM layer 535 and second FM layer 550 may comprise NiFe, and may each have a thickness from about 10 nm to about 40 nm.

In one aspect of this embodiment of the invention, AFC layer 540 comprises a single nonmagnetic metal layer. In this aspect, AFC layer 540 may comprise, for example, a single layer of Ru.

In another aspect of this embodiment of the invention, AFC layer 540 comprises a synthetic antiferromagnet (SAF) comprising a first AFC enhancing layer 541 above the first FM layer 535, a nonmagnetic spacer layer 542 above the first AFC enhancing layer 541, and a second AFC enhancing layer 543 above the nonmagnetic spacer layer 542. In one aspect of this embodiment of the invention, the first AFC enhancing layer 541 and/or the second AFC enhancing layer 543 may comprise CoFe, each having a Fe content from about 10 atomic percent (at. %) to about 70 at. %. Further in this aspect, the first AFC enhancing layer 541 and the second AFC enhancing layer 543 may each have a thickness less than about 2 nanometers (nm), and in yet a further aspect, AFC layer 540 may have a total thickness 545 of less than about 4 nm.

In one embodiment of the invention, an exchange coupling insertion layer 560 is above second FM layer 550, enhancing exchange coupling between AFM layer 570 and the second FM layer 550, and providing stabilization by improving pinning strength from AFM layer 570 to second FM layer 550. A cap layer, 575 is above magnetic top shield 590, and may comprise any suitable material, for example Ru. AFM layer 570 may comprise any suitable AFM material, and in one aspect of this embodiment may comprise IrMn, RuMn, FeMn; and in another aspect may also comprise PdMn, NiMn, or PtMn if a higher blocking temperature is desired. In a further aspect, AFM layer 570 may comprise a layer of IrMn having a thickness from about 5 nm to about 20 nm.

In one embodiment of the invention, exchange coupling insertion layer 560 comprises a single layer of CoFe, where the CoFe has a Fe content from about 35 at. % to about 45 at. %, and may have a thickness 565 from about 1 nm to about 3 nm. This embodiment provides larger exchange coupling $H_{ex}$, compared to a design where the exchange coupling insertion layer 560 is not used; and requires only the addition of a single layer.

In another embodiment of the invention, exchange coupling insertion layer 560 comprises a bi-layer, the bi-layer having a first sub-layer 561 above second FM layer 550, and a second sub-layer 562 above first sub-layer 561. In one aspect of this embodiment of the invention, first sub-layer 561 comprises a layer of CoFe with Fe content about 10 at. %, and second layer 562 comprises a layer of CoFe with Fe content from about 35 at. % to about 45 at. %. In a further aspect, insertion layer 560 may have a thickness 565 of less than about 4 nm. In yet another aspect, the first sub-layer 561 comprises a layer of CoFe with Fe content from about 8 at. % to about 12 at. %. This embodiment provides lower coercivity $H_c$ than the single layer exchange coupling insertion layer 560, and similar exchange coupling $H_{ex}$, as the single layer embodiment. This provides improved exchange coupling to AFM layer 550 with the low coercivity insertion layer 560.

Other and/or different components may be fabricated in other embodiments. For example, in some embodiments, coupling layers, stop layers and/or seed layers may also remain between layers as part of the fabrication process.

The description of the invention is provided to enable any person ordinarily skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those ordinarily skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A magnetic recording sensor for use in a data storage device, the magnetic recording sensor comprising:
    a read sensor positioned between a magnetic bottom shield and a magnetic top shield;

wherein the magnetic top shield comprises:
   a first ferromagnetic (FM) layer above a nonmagnetic layer, the first FM layer comprising a first soft magnetic material;
   an antiferromagnetic coupling (AFC) layer above the first FM layer;
   a second FM layer above the AFC layer, the second FM layer comprising a second soft magnetic material;
   an exchange coupling insertion layer above the second FM layer, and
   an antiferromagnetic (AFM) layer above the exchange coupling insertion layer;
   wherein the AFC layer comprises a first AFC enhancing layer above the first FM layer, a nonmagnetic spacer layer above the first AFC enhancing layer, and a second AFC enhancing layer above the nonmagnetic spacer layer.

2. The magnetic recording sensor of claim 1 wherein the soft magnetic material comprises NiFe.

3. The magnetic recording sensor of claim 1 wherein the AFM layer comprises IrMn, PtMn, RuMn, NiMn, FeMn, or PdMn.

4. The magnetic recording sensor of claim 1 wherein the first AFC enhancing layer and the second AFC enhancing layer comprise CoFe, wherein the Fe content comprises from about 10 at. % to about 70 at. %.

5. The magnetic recording sensor of claim 1 wherein the first AFC enhancing layer has a thickness less than 2 nm and the second AFC enhancing layer has a thickness less than 2 nm.

6. The magnetic recording sensor of claim 1 wherein the first FM layer and second FM layer each have a thickness from about 10 nm to about 35 nm, and
   the AFM layer has a thickness from about 5 nm to about 20 nm.

7. The magnetic recording sensor of claim 1 wherein the first soft magnetic material and the second soft magnetic material comprise the same soft magnetic material.

8. A magnetic recording sensor for use in a data storage device, the magnetic recording sensor comprising:
   a read sensor positioned between a magnetic bottom shield and a magnetic top shield;
   wherein the magnetic to shield comprises:
      a first ferromagnetic (FM) layer above a nonmagnetic layer, the first FM layer comprising a first soft magnetic material;
      an antiferromagnetic coupling (AFC) layer above the first FM layer;
      a second FM layer above the AFC layer, the second FM layer comprising a second soft magnetic material;
      an exchange coupling insertion layer above the second FM layer, and
      an antiferromagnetic (AFM) layer above the exchange coupling insertion layer; and
   wherein the exchange coupling insertion layer comprises CoFe with a Fe content from about 35 at. % to about 45 at. %, and has a thickness from about 1 nm to about 3 nm.

9. A magnetic recording sensor for use in a data storage device, the magnetic recording sensor comprising:
   a read sensor positioned between a magnetic bottom shield and a magnetic top shield;
   wherein the magnetic to shield comprises:
      a first ferromagnetic (FM) layer above a nonmagnetic layer, the first FM layer comprising a first soft magnetic material;
      an antiferromagnetic coupling (AFC) layer above the first FM layer;
      a second FM layer above the AFC layer, the second FM layer comprising a second soft magnetic material;
      an exchange coupling insertion layer above the second FM layer, and
      an antiferromagnetic (AFM) layer above the exchange coupling insertion layer; and
   wherein the exchange coupling insertion layer comprises a bi-layer, the bi-layer comprising a first sub-layer above the second FM layer and a second sub-layer above the first sub-layer, wherein:
      the first sub-layer comprises CoFe with a Fe content from about 8 at. % to about 12 at. %;
      the second sub-layer comprise CoFe with a Fe content from about 35 at. % to about 45 at. %, and
      the bilayer has a thickness less than about 4 nm.

10. A disk drive comprising:
   a slider including a magnetic recording sensor, the magnetic recording sensor configured to reside in proximity to a recording medium during use, the magnetic sensor comprising:
   a read sensor positioned between a magnetic bottom shield and a magnetic top shield;
   wherein the magnetic top shield comprises:
      a first ferromagnetic (FM) layer above a nonmagnetic layer, the first FM layer comprising a first soft magnetic material;
      an antiferromagnetic coupling (AFC) layer above the first FM layer;
      a second FM layer above the AFC layer, the second FM layer comprising a second soft magnetic material;
      an exchange coupling insertion layer above the second FM layer, and
      an antiferromagnetic (AFM) layer above the exchange coupling insertion layer, wherein:
      the exchange coupling insertion layer comprises CoFe with a Fe content from about 35 at. % to about 45 at. %, and a thickness from about 1 nm to about 3 nm.

11. The magnetic recording sensor of claim 10 wherein the first soft magnetic material and the second soft magnetic material comprise the same soft magnetic material.

12. A disk drive comprising:
   a slider including a magnetic recording sensor, the magnetic recording sensor configured to reside in proximity to a recording medium during use, the magnetic sensor comprising:
   a read sensor positioned between a magnetic bottom shield and a magnetic top shield;
   wherein the magnetic top shield comprises:
      a first ferromagnetic (FM) layer above a nonmagnetic layer, the first FM layer comprising a first soft magnetic material;
      an antiferromagnetic coupling (AFC) layer above the first FM layer;
      a second FM layer above the AFC layer, the second FM layer comprising a second soft magnetic material;
      an exchange coupling insertion layer above the second FM layer, and
      an antiferromagnetic (AFM) layer above the exchange coupling insertion layer, wherein:
      the exchange coupling insertion layer comprises a bi-layer, the bi-layer comprising a first sub-layer above the second FM layer and a second sub-layer above the first sub-layer, wherein:
      the first sub-layer comprises CoFe with a Fe content from about 8 at. % to about 12 at. %;

the second sub-layer comprise CoFe with a Fe content from about 35 at. % to about 45 at. %, and
the bilayer has a thickness less than about 4 nm.
13. The disk drive of claim 12 wherein the first soft magnetic material and the second soft magnetic material comprise the same soft magnetic material.

\* \* \* \* \*